April 3, 1962 — O. C. SEVERSON — 3,027,786
BORING BARS HAVING INDEXIBLE AND DISPOSABLE CUTTER INSERTS
Filed Nov. 12, 1959 — 2 Sheets-Sheet 1
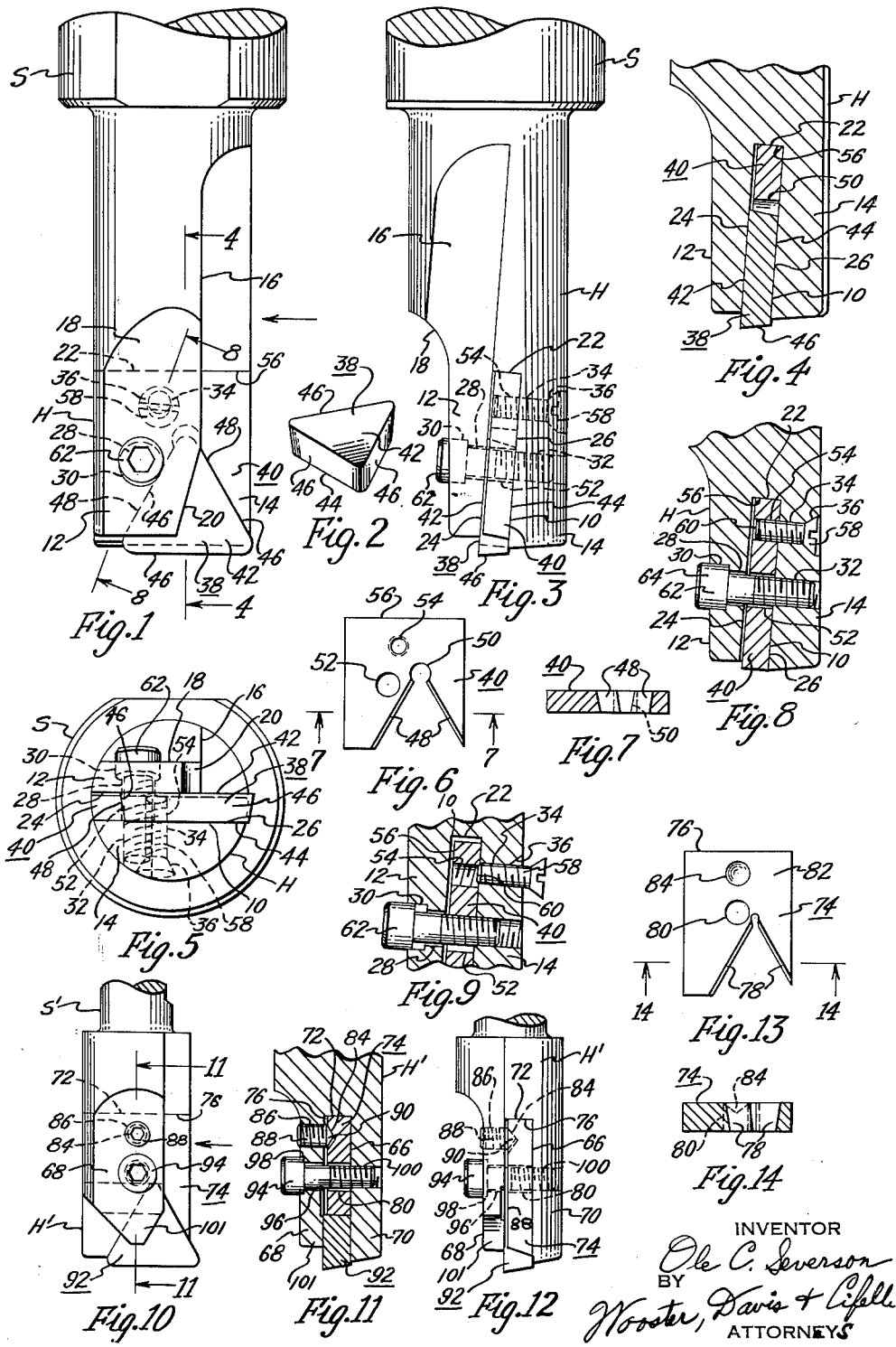
INVENTOR
Ole C. Severson
BY Wooster, Davis & Cifelli
ATTORNEYS April 3, 1962    O. C. SEVERSON    3,027,786
BORING BARS HAVING INDEXIBLE AND DISPOSABLE CUTTER INSERTS
Filed Nov. 12, 1959    2 Sheets-Sheet 2
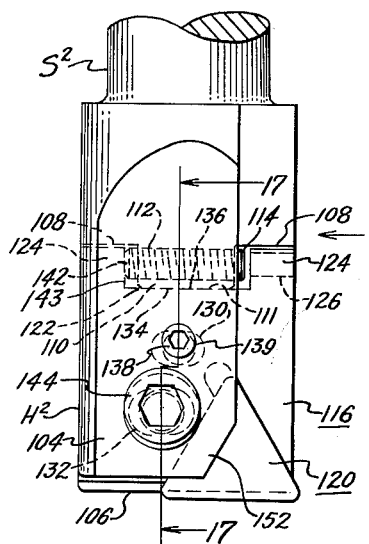
Fig.15
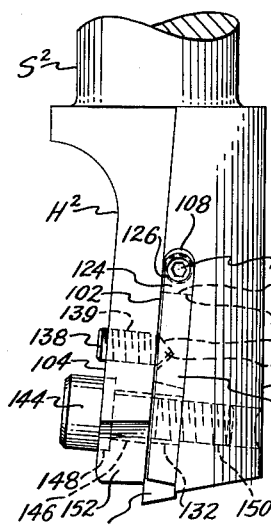
Fig.16
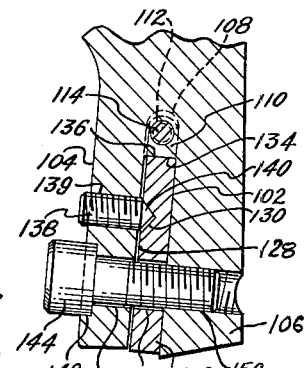
Fig.17
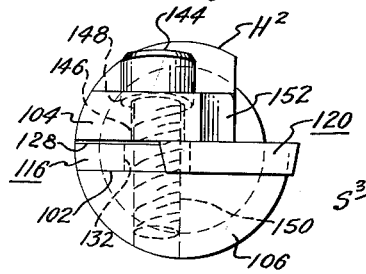
Fig.18
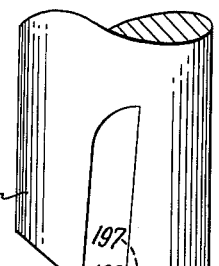
Fig.19
Fig.20
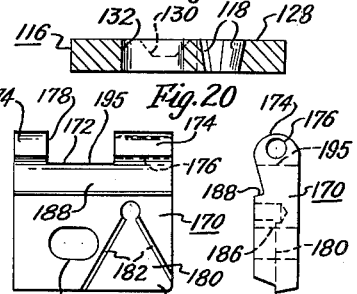
Fig.22
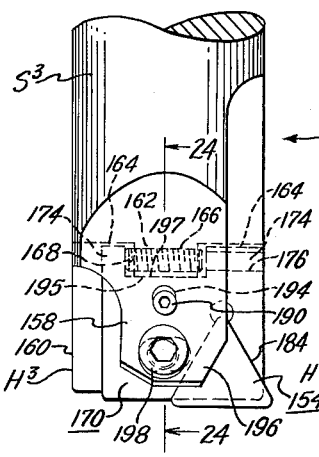
Fig.21
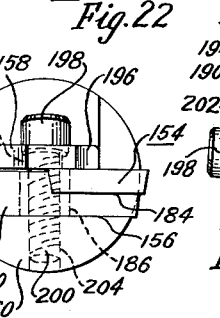
Fig.23
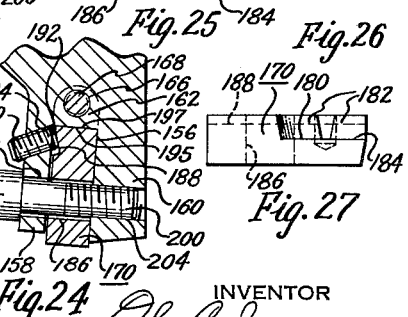
Fig.24    Fig.25    Fig.26    Fig.27
INVENTOR
Ole C. Severson
BY
Wooster, Davis & Cifelli
ATTORNEYS United States Patent Office 3,027,786
Patented Apr. 3, 1962

3,027,786
BORING BARS HAVING INDEXIBLE AND
DISPOSABLE CUTTER INSERTS
Ole C. Severson, Shelton, Conn., assignor to The Viking
Tool Company, Shelton, Conn., a corporation of
Connecticut
Filed Nov. 12, 1959, Ser. No. 852,309
13 Claims. (Cl. 77—58)

This invention relates generally to metal cutting tools, such as boring bars, and particularly to improvements in such tools pertaining to the construction and arrangement of the metal cutting means thereof.

In many metal cutting tool assemblies, separate indexible and disposable cutter inserts are utilized with a tool holder, and the advantages of such cutter inserts are generally recognized in the machine tool art. The utilization of separate indexible and disposable cutter inserts in boring bars creates many problems, and therefore, to my knowledge there have never been produced practical boring bars having separate indexible and disposable cutter inserts. These problems are principally acute in boring bars of relatively small diameters, such as diameters of approximately one-half inch. It is extremely difficult to provide a simple, rugged, low cost boring bar of this size having separate indexible and disposable cutter inserts which is operationally effective and practical.

It is an object of the invention to provide improved metal cutting tools, such as boring bars, having improved cutting means.

It is another object of the invention to provide improved boring bars which include separate indexible and disposable cutter inserts.

It is still another object of the invention to provide improved boring bars as set forth in the preceding paragraph which are simple in construction and low in cost of manufacture, substantially completely trouble-free in usage, and which are rugged and possess maximum strength notwithstanding the fact that they include a separate indexible and disposable cutter insert.

It is a still further object of the invention to provide improved metal cutting tools, such as boring bars, having separate indexible and disposable cutter inserts, wherein the cutter inserts are laterally adjustably mounted in the boring bars.

The above and other objects and further details of that which I believe to be novel and my invention will be clear from the following description and claims taken with the accompanying drawings, wherein:

FIG. 1 is a top plan view of one form of boring bar which incorporates the invention;

FIG. 2 is a perspective view of a separate indexible and disposable cutter insert which may be used with any of the forms of boring bars disclosed herein;

FIG. 3 is a side elevational view of the FIG. 1 form of boring bar looking in the direction of the arrow in FIG. 1;

FIG. 4 is a sectional view taken substantially on line 4—4 of FIG. 1;

FIG. 5 is a front elevational view of the FIG. 1 form of boring bar;

FIG. 6 is a top plan view of one of the elements of the FIG. 1 form of boring bar;

FIG. 7 is a sectional view taken substantially on line 7—7 of FIG. 6;

FIG. 8 is a sectional view taken substantially on line 8—8 of FIG. 1;

FIG. 9 is a view of a portion of FIG. 8 showing some of the parts during assembly thereof;

FIG. 10 is a top plan view of another form of boring bar which incorporates the invention;

FIG. 11 is a sectional view taken substantially on line 11—11 of FIG. 10;

FIG. 12 is a side elevational view of the FIG. 10 form of boring bar looking in the direction of the arrow in FIG. 10;

FIG. 13 is a top plan view of one of the elements of the FIG. 10 form of boring bar;

FIG. 14 is a sectional view taken substantially on line 14—14 of FIG. 13;

FIG. 15 is a top plan view of another form of boring bar which incorporates the invention;

FIG. 16 is a side elevational view thereof looking in the direction of the arrow in FIG. 15;

FIG. 17 is a sectional view taken substantially on line 17—17 of FIG. 15;

FIG. 18 is a front elevational view of the FIG. 15 form of boring bar;

FIG. 19 is a top plan view of one element of the FIG. 15 form of boring bar;

FIG. 20 is a sectional view taken substantially on line 20—20 of FIG. 19;

FIG. 21 is a top plan view of another form of boring bar which incorporates the invention;

FIG. 22 is a side elevational view thereof looking in the direction of the arrow in FIG. 21;

FIG. 23 is a front elevational view thereof;

FIG. 24 is a sectional view taken substantially on line 24—24 of FIG. 21, and

FIGS. 25, 26 and 27 are respectively a top plan view, a side elevational view and a front elevational view of one element of the FIG. 21 form of boring bar.

There are four forms of boring bars illustrated in the drawings which incorporate the invention. In describing all forms of boring bars, directional references will be made for the sake of convenience in disclosure; it should be understood that when operatively associated, the boring bars may assume other dispositional relationships. All of the illustrated forms of boring bars have certain common characteristics which will be briefly described prior to describing each individual form of boring bar in detail.

The invention pertains generally to boring bars which are used with boring machine tools, and is particularly concerned with the provision of such boring bars which are simple in construction and low in cost of manufacture, substantially completely trouble-free in usage, and rugged and of maximum strength for their size. The invention, however, is more particularly concerned with such boring bars which are of small diameter, and therefore, in which it is particularly difficult to provide the referred-to desired attributes. This will be appreciated by those skilled in this art, as will the desirability of providing improved boring bars of the nature set forth.

All illustrated forms of boring bars comprise a generally cylindrical supporting body in the form of a shank having a head with a diametral slot which forms two spaced lips at the front of the head between which are disposed portions of a separate indexible and disposable cutter insert and a positioning element therefor, which is herein referred to as a "grill." It will be quickly appreciated by those skilled in the machine tool art that the utilization of a separate indexible and disposable cutter insert in a boring bar automatically produces distinct and important advantages over existing boring bars which include integrally formed cutting means, such as bits, or cutting means having only a single or restricted cutting edge or tip. Cutter inserts as contemplated by the instant invention, which have been characterized as indexible and disposable, are in the form of relatively small solid wafers of a suitable, hard, metal cutting material, such as a high speed tool steel, a cast alloy, a carbide such as tungsten carbide or the like, or a ceramic. These wafers may vary in the shape of their plan outline, and principally may take any polygonal shape. Furthermore, the separate cutter inserts may be mounted in the slotted head of the boring bar so as to assume any desirable rake angle, that is, negative, neutral or positive, in both the axial and radial directions; notwithstanding the fact that a particular rake angle has been illustrated in the various illustrated forms of boring bar, this is solely for the purpose of illustration and it should be realized that other rake angles may be utilized if desired in accordance with known machine tool practice. In all illustrated forms of boring bar, the boring bar body itself may be made of a suitable alloy steel, and in all illustrated forms of boring bars other than the one illustrated in FIGS. 21–27, the grill may also be made of a suitable alloy steel; the grill in the latter form is preferably made of a hard material, such as carbide, as will be discussed subsequently in describing this form of boring bar. In all illustrated forms of boring bars, the separate cutter insert is positioned in and relative to the head by the grill in such a manner that a portion thereof is lockingly clamped by the lips of the slotted head. In all illustrated forms, the grill is independently, rigidly and detachably mounted in and relative to the slotted head, and the cutter insert is mounted in and relative to the slotted head independently of the grill, though it is positioned thereby. Therefore, cutter inserts may be mounted, indexed or removed without disturbing the grill mounting. In all illustrated forms, the cutter inserts are mounted by the lips of the slotted head in such a manner that metal chips created during a cutting operation are unable to enter between the cutter insert and lips.

With the above background information, which applies generally to all the illustrated forms of boring bars, in mind, each individual illustrated form of boring bar will now be described in detail.

In the first form of boring bar, illustrated in FIGS. 1–9, the boring bar comprises a body having the usual cylindrical shank S, which is designed in the conventional manner so as to be mountable in a boring machine tool and includes a head H at its front. The head H includes a generally transverse diametral slot 10 at its front end which thereby forms an upper lip 12 and a lower lip 14. The upper lip 12 is more flexible than the lower lip 14 and is relieved at one lateral side by a cut-away portion 16 which extends rearwardly into head H. Upper lips 12 at its top is relieved by a cut-away portion 18, and it is further cut away at one forward lateral side thereof to form a clamping portion 20. The relieved portions 16 and 18 of the upper lip 12 provide operational clearances, as will be understood by those skilled in the art.

The rear of the slot 10 is formed by a generally transverse and flat rear wall 22, and determine the rearward limits of the lips 12 and 14. The downwardly facing lower surface of the upper lip 12 is designated 24, and the upwardly facing upper surface of the lower lip 14 is designated 26; these surfaces are spaced and generally horizontal, though inclined as illustrated to indicate a positive axial rake angle. Extending generally vertically downwardly through the upper lip 12 is a plain bore 28 having an enlarged plain counterbore 30. In the lower lip 14 there is formed a threaded bore 32 which is coaxial with the bores 28 and 30. Spaced rearwardly of the bore 32 there is formed in the lower lip 14 a spaced parallel threaded bore 34 having an enlarged tapered plain counterbore 36. In the foregoing description, the slot 10 has been referred to as generally transverse and the angular orientation of the bores has been referred to as generally vertical. It should be understood that the particular angular disposition of the slot and bores is not critical to the invention, for, as was pointed out above, the particular rake angles may vary as desired. The illustrations show the slot 10 disposed to provide a positive axial rake and a neutral radial rake. It is desirable, however, that the bores formed in the lips 12 and 14 be disposed on axes that are generally perpendicular to the major plane of the slot 10.

Removably but rigidly, mounted in the slot 10 of the head H is an element for positioning a separate indexible and disposable cutter insert 38. This element is referred to throughout this specification as a grill, and is designated generally by reference numeral 40. When fully mounted, the grill 40 is "cammed" against the rear slot wall 22, as will become more fully apparent subsequently.

A cutter insert 38 is illustrated by itself in FIG. 2, and it will there be observed that it is generally triangular in plan outline and includes upper and lower flat, parallel sides 42 and 44 and three flat edges 46. The edges 46 are appropriately inclined relative to the upper and lower sides, so as to be non-perpendicular relative thereto and thereby provide the desired clearance for the cutter insert during operation, when it is disposed in the illustrated positive axial rake. For certain rakes, however, the edges could be perpendicular to the sides of the cutter insert.

The grill 40, which is shown by itself in FIGS. 6 and 7, comprises a plate-like member which is generally rectangular in overall outline. Grill 40 at its front includes a cut out generally V-shaped notch for receiving and positioning a cutter insert which is formed by a pair of appropriately inclined edges 48. The notch includes a relief bore 50. A plain bore 52 and a spaced threaded bore 54 are formed in the grill, all as can be clearly seen in FIG. 6. The grill 40 at its rear includes a straight flat edge 56 which is arranged to be cammed into firm contact with the rear slot wall 22 when the grill is operatively mounted in the slot 10.

The grill 40 is rigidly, but detachably, mounted in the slot 10 independently of the cutter insert 38. When so mounted, the grill 40 is securely anchored to head H in the slot 10 in firm contact with the upper surface 26 of the lower lip 14 and cammed against the rear slot wall 22. The manner in which the grill 40 is mounted may be understood by referring to FIGS. 8 and 9. In FIG. 9 there is illustrated somewhat schematically the relationship of the grill 40 and the slot 10 during the steps of mounting the grill therein. The grill 40 is mounted by a grill-retaining screw 58 in the form of a flat-head cap screw having a somewhat rounded tip 60. From FIG. 8 it will be observed that the bore 34 in the lower lip 14 is spaced from the rear slot wall 32 a distance slightly less than the distance that the bore 54 in the grill 40 is spaced from the rear edge 56 thereof. Therefore, during the steps of mounting the grill, as the grill-retaining screw 58 is inserted through the bore 34 in the lower lip 14 into the bore 54 in the grill 40, the grill is simultaneously pulled downwardly against the upper surface 26 of the lower lip 14 and cammed rearwardly against the rear slot wall 22, thereby firmly anchoring the grill in the slot 10 in an independent detachable manner. During initial insertion of the grill-retaining screw 58 into the bore 54, the rounded tip 60 of the screw facilitates entry of the screw (see FIG. 9). Further insertion results in the referred-to simultaneous downward pulling and camming of the grill. When the grill is fully mounted, the notch in the grill cooperates with a portion of surface 26 of the lower lip 14 to provide a stable pocket for the separate cutter insert 38 which supports the latter on its bottom lower side 44 and two of its edges 46.

It will be observed that the notch formed in the grill by the edges 48 is such as to accommodate the illustrated triangular cutter insert 38. It will be understood that the particular shape of notch provided in the grill will depend upon the particular shape of the cutter insert to be utilized in the boring bar. Regardless of the general outline shape of the cutter insert and notch in the grill utilized, however, the thickness of the grill is intentionally selected so that it is slightly less than the minimum tolerance of the thickness of the cutter insert 38. The cutter insert is operatively mounted in the pocket formed by the grill notch in the manner illustrated particularly in FIG. 1. It will there be observed that one of the cutter insert edges 46 extends beyond the front of both of the lips 12 and 14 and thereby constitutes the cutting implement for the boring bar. It will also be observed in FIG. 1 that the cutter insert 38 may be selectively disposed in the grill notch so as to individually utilize each of its edges 46 as a cutting implement. Therefore, as one cutting edge 46 becomes dull from use, other unused edges 46 may be indexed into position to function as a cutting implement. It will be observed, particularly in FIG. 5, that the inclinations of the cutter insert edges 46 and the grill notch forming edges 48 are complementary so as to properly accommodate the cutter insert in the notch. When the cutter insert is fully mounted in its pocket, its lower wall 44 rests on the surface 26 of the lower lip, and in view of the fact that it is intentionally made slightly thicker than the grill 40, its upper wall 42 extends slightly above the upper surface of the grill. The relevance of the thickness relationship of the grill and cutter insert will become apparent from the following description of the mounting of the cutter insert.

The cutter insert 38 is detachably locked in head H in position in the pocket formed by the grill notch as a result of the upper lip 12 being biased downwardly toward the lower lip 14 and the cutter insert 38. The upper lip 12 is biased downwardly by an insert locking screw 62 in the form of a socket head cap screw having a shank that passes through the plain bore 28 in the upper lip 12, the plain bore 52 in the grill 40, and is anchored in the threaded bore 32 in the lower lip 14. When fully mounted, the insert locking screw 62 has its head 64 disposed and axially restrained in the plain counterbore 30 formed in the upper lip 12 in such a manner that the upper lip 12 is biased downwardly toward the lower lip 14 when the insert locking screw 62 is tightened. Downward movement of the upper lip 12 causes the latter to contact the upper side 42 of cutter insert 38 and force the cutter insert against the upper surface 26 of lower lip 14 and thereby clampingly lock the cutter insert between the lips. This clamping action is somewhat similar to a "pinching" action, and it should be particularly observed that the operative effect of this pinching action occurs principally centrally of the cutter insert 38, because the clamping force is applied principally along a line by the clamping portion 20 of the upper lip 12, it being noted in this regard that none of the clamping force is applied to the grill 40, because of the latter's lesser thickness than that of the cutter insert 38. Further, it should be noted that this clamping line contact prevents metal chips formed during operation from entering between the upper lip and cutter insert.

The foregoing comprises a complete description of the construction and operation of the FIGS. 1–9 form of boring bar. As pointed out in the introduction to this specification, the boring bar body may be made of an alloy steel, which is preferably treated to a spring temper, the grill also may be made of an alloy steel, and the cutter inserts are preferably made of one of the known hard materials referred to.

It should be observed that in the FIGS. 1–9 form of boring bar, the cutter insert positioning grill 40 is independently, rigidly and detachably secured to the head H principally in the slot 10, and that the cutter insert 38 is clampingly locked by the lips so as to be readily mounted, indexed or removed.

The second form of boring bar which incorporates the instant invention is illustrated in FIGS. 10–14. The principal difference between this form of boring bar and the FIGS. 1–9 form resides in the means for mounting and retaining the grill in the boring bar head. Therefore, much of the detailed description of this form of boring bar which is generally common to that of the FIGS. 1–9 form will not be specifically repeated.

The FIGS. 10–14 form of boring bar is illustrated as utilizing a triangular cutter insert of the same type as the cutter insert 38. The boring bar comprises a generally cylindrical body in the form of a shank $S^1$ having a head $H^1$ which is slotted by a generally diametral transverse slot 66 which forms an upper lip 68, a lower lip 70, and a flat rear slot wall 72. The upper lip 68 is more flexible than the lower lip 70.

Independently and detachably secured to the head $H^1$ and positioned principally in the slot 66 is a cutter insert positioning grill 74 which is illustrated by itself in FIGS. 13 and 14. The grill 74 comprises a plate-like member that is generally rectangular in overall outline having a flat straight rear edge 76 and a cut out notch formed by inclined side edges 78. A plain bore 80 extends through the grill and in the upper surface 82 of the grill there is formed a conical recess 84 which is spaced from the bore 80. In the upper lip 68 there is formed a threaded bore 86 in which is adjustably mounted a grill-retaining screw 88 in the form of a socket-head set screw having a conical tip 90. Threaded bore 86 is spaced from the rear slot wall 72 a distance slightly less than that of the recess 84 relative to the grill rear edge 76. Therefore, the bore 86 and recess 84 are slightly misaligned, and this results in the conical tip 90 of the set screw 88 contacting a rearward portion of the recess 84 when the screw is tightened, and thereby forcing the grill 74 downwardly against the upper surface of the lower lip 70, and camming the grill rearwardly against rear slot wall 72. This independently, securely and detachably mounts the grill 74 in the slotted head $H^1$ and causes a stable pocket to be formed by the grill notch and a portion of the upper surface of the lower lip 70 into which may be removably mounted an indexible and disposable cutter insert 92.

As was pointed out above, the illustrated cutter insert 92 is generally similar to the triangular cutter insert 38 of the FIGS. 1–9 form. As in the first form, the cutter insert 92 is slightly thicker than the grill 74, and is clampingly locked by an insert locking screw 94 in the form of a socket head cap screw. Screw 94 is mounted in a plain bore 96 and plain counterbore 98 formed in the upper lip 68 and extends therethrough and through the plain bore 80 in the grill 74, and is threadedly anchored in the threaded bore 100 formed in the lower lip 70. Releasable clamping locking of the cutter insert 92 in its positioning pocket is effected in substantially the same manner as the locking of the cutter insert 38 in the FIGS. 1–9 form of boring bar; the tightening of the insert locking screw 94 causes the upper lip 68 to be biased downwardly toward the cutter insert 92, and thereby causes the clamping portion 101 thereof to contact the central upper side of the cutter insert and force it downwardly against the lower lip 70.

The principal structural difference between the FIGS. 1–9 and FIGS. 10–14 forms of boring bar resides in the means for mounting and retaining the grill. The FIGS. 10–14 form of boring bar is particularly well suited for small diameter boring bars, because it possesses the advantage of allowing use of a set screw as the grill-retaining screw, instead of a cap screw, and therefore, requires less stock to be removed from the boring bar head. Furthermore, use of a set screw permits repositioning of the grill-retaining screw from the lower lip to the upper lip, which is usually more accessible and convenient in operation. It should be noted that as in the case of the FIGS. 1–9 form of boring bar, the clamping contact between the clamping portion 101 of the upper lip and the upper surface of the cutter insert is line contact, and therefore, metal chips which are formed during operation are not allowed to enter between the upper lip and the upper surface of the cutter insert. As in the case of the first illustrated form of boring bar, the illustrated rake of the FIGS. 10–14 form, which is shown as neutral in the axial direction, may be varied to any desired rake. The materials of which the various elements of this form of boring bar are made may be the same as those mentioned for the first form of boring bar.

Another form of boring bar which incorporates the invention is illustrated in FIGS. 15-20. This form of boring bar is generally similar to the FIGS. 10-14 form of boring bar, except that means is incorporated in it to provide for lateral adjustment of the cutter insert, and this necessarily requires certain structural changes.

This form of boring bar comprises a generally cylindrical body in the form of a shank $S^2$ having a head $H^2$ with a slot 102 which forms an upper lip 104 and a lower lip 106. The upper lip 104 is more flexible than the lower lip 106. The rear side of the slot 102 comprises a pair of laterally spaced curved side wall portions 108 and a forwardly projecting central portion 110 therebetween. A transverse threaded bore 112 is formed in the forwardly projecting portion 110, and a socket head set screw 114 is adjustably mounted in the bore 112.

The cutter insert positioning grill 116 is independently, rigidly, detachably, and transversely adjustably mounted in the boring bar head $H^2$. The grill 116 is illustrated by itself in FIGS. 19 and 20, wherein it will be observed that at its front it includes a notch formed by a pair of inclined edges 118, which are disposed to accommodate a triangular cutter insert 120 which is generally similar to the cutter inserts 38 and 92 of the first two forms of boring bar disclosed. At the rear side of the grill 116 there is formed a central cut-out notch 122 which is generally rectangular and forms a pair of spaced, rearwardly extending side projections 124, one of which includes a plain transverse bore 126. In the upper surface 128 of the grill 116 there is formed a laterally extending V-shaped recess 130, and spaced therefrom there is formed a laterally extending plain slot 132 which extends completely through the grill.

The grill 116 is mounted in the slot 102 in such a manner that it is urged rearwardly, its notch 122 is disposed to extend around the forwardly projecting portion 110 and its side projections 124 extend around the set screw 114, which is shorter than the lateral length of the notch 122. When in this position, the central rearwardly facing transverse flat edge 134 of the grill notch 122 is in firm planar contact with the forwardly facing flat edge 136 of the projecting portion 110, and the rearwardly facing curved ends of the grill side projections 124 are spaced from their associated spaced curved wall portions 108. The grill 116 is forced into and retained in this position by grill-retaining screw 138 in the form of a socket head set screw having a conical tip 140. Screw 138 is adjustably mounted in and extends through threaded bore 139 formed in the upper lip 104, and its conical tip 140 seats in the grill recess 130, contacts a rear side thereof and cooperates therewith to force the grill 116 downwardly against the upper surface of lower lip 106 and to cam the grill rearwardly so that its notch edge 134 is in firm planar contact with the edge 136 of the forwardly projecting portion 110. Therefore, the grill 116 is independently, firmly and detachably mounted in the head $H^2$. In this form of boring bar, the lateral position of the grill 116 may be selectively adjusted by adjusting the position of the adjusting screw 114, which may be effected by inserting an appropriate tool through the plain bore 126 in one of the grill projections 124 into the socket head of the adjusting screw 114. Such adjustment of the screw 114 causes its tip 142, which is flat, to contact laterally inwardly facing side 143 of the grill projection 124 that does not have the bore 126 and set a lateral limit in one direction beyond which the grill can not be moved. It will be understood that laterally adjustment of the grill 116 is effected prior to tightening the grill-retaining screw 138. However, the grill-retaining screw may be loosened at any time and the grill adjusted laterally.

The cutter insert 120 may be disposed in the pocket formed by the grill notch and a portion of the upper surface of the lower lip 106 and clampingly locked therein between the lips 104 and 106 by an adjustable insert locking screw 144 in the form of a socket head cap screw having a shank which extends through the plain bore 146 and plain counterbore 148 formed in the upper lip 104, extends through the grill slot 132 and is adjustably anchored in the threaded bore 150 formed in the lower lip 106. As in the case of the first two forms of boring bar, the grill 116 is thinner than the minimum thickness tolerance of the cutter insert. When the insert locking screw 144 is tightened, it biases the upper lip 104 downwardly toward the lower lip 106 and forces the clamping portion 152 of the upper lip 104 into clamping locking line contact with the upper surface of the cutter insert 120, generally centrally thereof.

In view of the foregoing it will be apparent that the FIGS. 15-20 form of boring bar, in addition to possessing the advantages of the FIGS. 10-14 form of boring bar, includes the additional advantage of having a cutter insert positioning grill which is laterally adjustable, and therefore, of providing for selective lateral adjustment of the cutter insert. It will be understood by those skilled in the art that lateral adjustment of the cutter insert is desirable. The range of adjustment of the cutter insert 120 laterally away from the upper lip 104 (to the right in FIG. 15) is limited as a practical matter by the lateral reach of the clamping portion 152 of the upper lip 104. The materials of which the elements of this form of boring bar are made may be the same as those which their counterparts in the first two forms of boring bar disclosed are made. Also, the illustrated positive axial rake and neutral negative rake may be varied, if desired.

In FIGS. 21-27 there is illustrated another form of boring bar which incorporates the invention. This form of boring bar, in addition to possessing the advantages of the FIGS. 15-20 boring bar, includes the additional advantage of being well suited for use in larger diameter boring bars wherein heavy cuts are to be made. This advantage is effected by providing the cutter insert pocket entirely in the grill; that is, not relying on the upper surface of the lower lip of the boring bar head to support the lower surface of the cutter insert, as is the case in the other forms of boring bar described thus far. By providing the cutter insert pocket in the grill entirely, the support of the cutter insert is continuous regardless of the position of the insert relative to the boring bar head. Also, in the event of damage to the grill, it may be replaced entirely at a minimum loss, because the grill is a relatively small part of the entire boring bar. Therefore, the grill may be made of a harder, more expensive material, such as a carbide, and thereby provide a material which is sufficiently hard to withstand heavier cuts. The other elements of the boring bar may be made of the same materials as their counterparts in the first three forms described, namely, the shank and head, $S^3$ and $H^3$, respectively, may be made of a suitable alloy steel; the cutter insert 154, which generally corresponds to the cutter inserts 38, 92 and 120 of the other forms of boring bars, may be made of the same type of material and is illustrated as being the same general shape.

The head $H^3$ includes a slot 156 which is somewhat thicker than the slots in the other forms of boring bars described. The slot forms an upper lips 158 and a lower lip 160; the upper lip is more flexible than the lower lip. The rear of the slot 156 is formed by a forwardly projecting central portion 162 and a pair of spaced side curved rear portions 164. The forwardly projecting portion 162 includes a transverse threaded central bore 166 in which is adjustably mounted an adjusting set screw 168 having a socket head.

Independently, rigidly, detachably and laterally adjustably mounted in the slot 156 is the grill 170, which is made of a very hard material, such as a carbide, and is shown by itself in FIGS. 25–27. The grill 170 at its rear includes a rearwardly facing central notch 172 which forms a pair of spaced curved rearwardly extending side projections 174, one of which includes a transverse plain bore 176, and the other of which includes a laterally inwardly facing wall 178 which cooperates with the flat head of adjusting screw 168 to fix the position of the grill 170 in one lateral direction. Laterally at the front of the grill 170 is formed a pocket 180 which comprises a pair of inclined side edges 182 and a flat, upwardly facing, generally triangular wall 184. Extending through the grill 170 is a laterally extending plain slot 186. Extending transversely of the grill 170, near but spaced from the rear thereof, is a V-shaped groove 188.

The grill 170 is mounted in slot 156 so as to have its rearwardly facing recess 172 cooperate with the forwardly projecting portion 162 of the bar to position the grill longitudinally in the slot 156. The relationship of the grill and rear slot portion of the bar is generally the same as their counterparts in the FIGS. 15–20 form. The adjusting screw 168 is shorter than the transverse length of grill notch 172 and is adjusted in the same manner as its counterpart in the FIGS. 15–20 form to effect lateral positioning of the grill 170. The grill 170 is retained in its laterally adjusted position by a grill-retaining screw 190 in the form of a socket head set screw having a flat tip 192 which is adjustably mounted in and extends through the inclined threaded bore 194 formed in the upper lip 158. The flat tip 192 is received in the groove 188 in the grill and cooperates therewith by contacting the rear wall thereof when it is tightened to force the grill downwardly against the upper surface of the lower lip 160 and cam it rearwardly so that the central transverse flat edge 195 of the notch 172 of the grill is in firm contact with the central forwardly facing flat edge 197 of the forwardly projecting portion 162.

A cutter insert 154, which is generally similar to the cutter inserts of the other forms, is disposed in the grill pocket 184 and clampingly locked therein by the clamping portion 196 of the upper lip 158 which is biased into contact with the upper surface of the cutter insert 154 by the insert locking screw 198 in the form of a socket head cap screw. Screw 198 has its shank 200 extending through a plain bore 202 formed in the upper lip 158, through the plain slot 186 in the grill and anchored in the threaded bore 204 formed in the lower lip 160. The clamping portion 196 contacts only the cutter insert 154 because the thickness of the grill 170 is less than the sum of the thicknesses of the cutter insert and the portion of the grill directly beneath the cutter insert. As in the case of the FIGS. 15–20 form, the range of lateral adjustment of the cutting insert 154 in one direction (to the right in FIG. 21) is limited by the reach of the clamping portion 196 of the upper lip 158. As in the case of the other illustrated forms of boring bars, the illustrated rake is merely exemplary and may be altered as desired. In view of the fact that the cutter insert 154 is firmly supported in a pocket which is entirely formed in the grill, which is preferably made of a very hard material, this form of boring bar admirably lends itself for use in large diameter boring bars wherein heavy cuts are to be taken.

In view of the foregoing, it will be apparent that applicant has disclosed in detail four separate forms of boring bars which incorporate this invention, and that all forms include certain advantages that adapt them for particular uses. All forms of boring bars desirably provide for the employment of separate indexible and disposable cutter inserts in the boring bar and provide for the easy and convenient mounting and adjusting of the cutter inserts. Also, all forms prevent the entry of metal chips formed during operation between the cutter insert and the clamping portion of the upper lip of the boring bar head.

The first two forms of boring bars disclosed are extremely economical to manufacture, are substantially trouble-free in use, and have maximum strength for boring bars that include separate indexible and disposable cutter inserts. In this regard, the FIGS. 10–14 form of boring bar is somewhat stronger than the FIGS. 1–9 for because it utilizes a set screw for its grill-retaining screw, and therefore, has less stock removed from the boring bar supporting body. It also possesses the additional advantage over the FIGS. 1–9 of having the grill-retaining screw accessible from hte top of the boring bar, which is usually convenient.

The last two forms of boring bars disclosed, in addition to possessing the advantages of the FIGS. 10–14 form, posess the additional advantage of providing for lateral adjustment of the grill and cutter insert. The FIGS. 21–27 form of boring bar possesses the still further advantage of providing a complete pocket for the cutter insert in the grill, which may be made of a harder material than the remainder of the boring bar body, and therefore, lends itself for use in large diameter boring bars wherein heavy cuts are to be taken.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A boring bar comprising: a boring bar body including a head with a slot formed therein which forms a pair of spaced lips and a transverse slot wall connecting said lips at adjacent ends thereof including a transverse flat wall portion; an indexible and disposable cutter insert having a portion thereof mounted between said lips and a portion extending beyond said head into cutting position; a cutter insert positioning grill having a flat edge portion and independently, rigidly and detachably secured to said head and mounted in said slot so as to have its edge portion in firm planar contact with said slot wall portion; means for securing said grill to said head; said grill having a notch of a shape for receiving a portion of and positioning said cutter insert in a number of different dispositional orientations; and means for selectively biasing said lips toward each other to cause said cutting insert to be detachably locked in said head, said biasing means being separate and spaced from said securing means whereby a cuter insert may be indexed or replaced by actuating said biasing means without disturbing the mounting of said grill or its securing means.

2. The invention defined in claim 1 wherein one of said lips is arranged to overlie said cuter insert; and said biasing means is adapted to bias said one of said lips into contact with said cutter insert to lock the latter.

3. The invention defined in claim 1 wherein said securing means cams said edge portion against said slot wall portion and one of said lips.

4. The invention defined in claim 3 wherein said securing means comprises a threaded member that is threadedly mounted in one of said lips and in said grill.

5. The invention defined in claim 3 wherein said securing means comprises a threaded member that is threadedly mounted in one of said lips, and said threaded member has a conical tip that is received in a conical recess formed in said grill.

6. The invention defined in claim 3 wherein said securing means comprises a threaded member that is threadedly mounted in one of said lips; and said threaded member has a flat tip that is received in a V-shaped groove formed in said grill.

7. The invention defined in claim 1 wherein said grill has a pocket for supporting said cutter insert on at least two edge walls and one side wall thereof.

8. The invention defined in claim 1 wherein said grill is thinner than said cutter insert and has a plain opening; one of said lips has a plain opening; the other of said lips has a threaded opening; all of said openings being aligned, and a headed threaded member extends through said plain openings and is adjustably threadedly received in said threaded opening, whereby on tightening of said threaded member said lips are biased toward each other and said cutter insert is thereby locked in said head.

9. The invention defined in claim 8 wherein one of said lips is arranged to overlie said cutter insert; and said threaded member is adapted to bias said one of said lips into contact with said cutter insert to lock the latter.

10. In a boring bar including a boring bar body having a head, a separate indexible and disposable cutter insert, and means for selectively detachably securing said cutter insert to said head in any one of a plurality of different positions relative thereto so as to dispose a different portion of said cutter insert in cutting position, said means comprising: a slot in said head which forms a pair of spaced lips and a slot wall connecting said lips at adjacent ends including a transverse flat wall portion; one of said lips having a threaded bore spaced from said slot wall; a cutter insert positioning grill which is detachably mounted in said slot and has a flat edge thereof cammed against said slot wall portion; said grill having a notch for accommodating said cutter insert and a threaded bore spaced from said edge a distance slightly greater than the distance from the bore in the lip to the slot wall; a threaded member disposed in both of said threaded bores, whereby camming of said edge against said slot wall portion results from tightening said threaded member in said bores; and means separate and spaced from said threaded member for clamping said cutter insert between said lips.

11. In a boring bar including a boring bar body having a head, a separate indexible and disposable cutter insert, and means for selectively detachably securing said cutter insert to said head in any one of a plurality of different positions relative thereto so as to dispose a different portion of said cutter insert in cutting position, said means comprising: a slot in said head which forms a pair of spaced lips and a slot wall connecting said lips at adjacent ends including a transverse flat wall portion; one of said lips having a threaded bore spaced from said slot wall; a cutter insert positioning grill which is detachably mounted in said slot and has a flat edge thereof cammed against said slot wall portion; said grill having a notch for accommodating said cutter insert and a conical recess spaced from said edge a distance slightly greater than the distance from the bore in the lip to the slot wall; a threaded member disposed in said bore and having a conical tip disposed in said recess, whereby camming of said edge against said slot wall portion results from tightening said threaded member in said bore; and means separate and spaced from said threaded member for clamping said cutter insert between said lips.

12. In a boring bar including a boring bar body having a head, a separate indexible and disposable cutter insert, and means for selectively detachably securing said cutter insert to said head in any one of a plurality of different positions relative thereto so as to dispose a different portion of said cutter insert in cutting position, said means comprising: a slot in said head which forms a pair of spaced lips; a cutter insert positioning grill which is detachably mounted in said slot; means for securing said grill to said head means for adjusting the lateral position of said grill in said slot; and means separate and spaced from said securing means for locking said cutter insert between said lips.

13. A boring bar as defined in claim 12 wherein said adjusting means comprises a central forwardly projecting portion on the rear wall of said slot; a laterally extending threaded member adjustably mounted in said portion; and a notch in said grill which extends around said portion and includes a projection that is disposed laterally adjacent to said portion, whereby said threaded member is arranged to contact said projection and limits its lateral position in one direction.

References Cited in the file of this patent

UNITED STATES PATENTS

| | | |
|---|---|---|
| 1,346,056 | Poulain | July 6, 1920 |
| 1,993,752 | Reaney | Mar. 12, 1935 |
| 2,127,998 | Jearum | Aug. 23, 1938 |
| 2,887,760 | Armstrong | May 26, 1959 |